US006405393B2

(12) United States Patent
Megown

(10) Patent No.: US 6,405,393 B2
(45) Date of Patent: Jun. 18, 2002

(54) HEIGHT AND ANGLE ADJUSTABLE BED HAVING A ROLLING BASE

(76) Inventor: Michael W. Megown, 801 Terry La., Washington, MO (US) 63090

(*) Notice: Subject to any disclaimer, the term of this patent is extended or adjusted under 35 U.S.C. 154(b) by 0 days.

(21) Appl. No.: 09/739,910

(22) Filed: Dec. 19, 2000

Related U.S. Application Data

(60) Provisional application No. 60/200,902, filed on May 1, 2000.

(51) Int. Cl.[7] .......................... A61G 7/012; B62B 11/00

(52) U.S. Cl. .......................... 5/611; 5/86.1; 280/43.23; 280/47.34; 280/35

(58) Field of Search .......................... 5/610, 611, 86.1; 296/20; 280/43.23, 47.34, 35, 651, 676, 682

(56) References Cited

U.S. PATENT DOCUMENTS

| | | | | | |
|---|---|---|---|---|---|
| 997,284 | A | | 7/1911 | Fuller | |
| 1,622,447 | A | | 3/1927 | Kalberer | |
| 2,095,948 | A | | 10/1937 | Almquist et al. | |
| 2,197,273 | A | | 4/1940 | Lindeman | |
| 2,451,353 | A | | 10/1948 | Newell | |
| 2,713,179 | A | | 7/1955 | Clifton | |
| 3,305,876 | A | | 2/1967 | Hutt | |
| 3,433,500 | A | | 3/1969 | Christensen | |
| 3,644,944 | A | | 2/1972 | Bourgraf et al. | |
| 3,802,002 | A | * | 4/1974 | Jonas | 108/147 |
| 3,967,342 | A | | 7/1976 | Gebhard | |
| 3,980,334 | A | | 9/1976 | Ferneau et al. | |
| 4,023,849 | A | * | 5/1977 | Bethlen | 280/640 |
| 4,052,097 | A | | 10/1977 | Weil et al. | |
| 4,282,628 | A | | 8/1981 | McCarroll | |
| 4,289,324 | A | | 9/1981 | Nemeth | |
| 4,327,460 | A | | 5/1982 | Wolff | |
| 4,748,715 | A | | 6/1988 | Rice | |
| 4,759,098 | A | | 7/1988 | Ko | |
| 5,084,922 | A | * | 2/1992 | Louit | 296/20 |
| 5,172,451 | A | | 12/1992 | Chiu | |
| 5,347,680 | A | | 9/1994 | Rippe | |
| 5,377,372 | A | | 1/1995 | Rudolf et al. | |
| 5,432,966 | A | * | 7/1995 | Berta et al. | 296/20 |
| 5,507,069 | A | | 4/1996 | Willis | |
| 5,562,167 | A | | 10/1996 | Honey | |
| 5,628,377 | A | | 5/1997 | Le Gloan | |
| 5,890,238 | A | | 4/1999 | Votel | |
| 5,890,866 | A | | 4/1999 | Scheibel | |
| 5,898,961 | A | | 5/1999 | Ambach | |
| 2001/0047547 | A1 | * | 12/2001 | Paul | 5/611 |

FOREIGN PATENT DOCUMENTS

| | | | | |
|---|---|---|---|---|
| DE | 2538411 | | 3/1977 | |
| DE | 3631409 | | 3/1988 | |
| FR | 2506153 | | 11/1982 | |
| GB | 2068301 A | * | 8/1981 | 5/611 |

* cited by examiner

*Primary Examiner*—Michael F. Trettel
(74) *Attorney, Agent, or Firm*—Kevin L. Klug

(57) ABSTRACT

A height and angle adjustable bed having a rolling base which utilizes a unique pivoting base having castors and a unique support arm assist spring mechanism. The pivoting castor base allows movement of the bed in any direction on the plane of the floor when also positioned at any user desired height while also providing a stable and lockable support for the bed. The support arm spring mechanism provides an initial assist force when the bed is in a nearly or fully lowered position and thereby minimizes the force required by the linear actuators used to raise the bed.

14 Claims, 7 Drawing Sheets

HEIGHT AND ANGLE ADJUSTABLE BED HAVING A ROLLING BASE

This application claims priority of Provisional Patent Application #60/200,902, filed May 1, 2000.

BACKGROUND OF THE INVENTION

This invention relates to height and angle adjustable beds in general and more specifically to a bed which is typically found in a hospital or nursing care facility and commonly known in the medical and nursing care industries as a low height adjustable bed or a low bed. A unique aspect of the present invention is its movability in any direction on the floor plane while positioned at any user desired height or angle position. This includes heights which are substantially lower and higher than prior art industry standard low beds and positions such as the Trendelenburg, reverse Trendelenburg, or cardiac chair. The art of the present invention further provides a means for reducing the mechanical actuator force necessary for raising or lowering the bed.

Prior art height and angle adjustable low bed designs provide front and rear lifting and support capabilities and further provide a bed rolling capability when maintained at a specific factory set height. (usually a fully lowered position) The conventional low bed design provides a wide range of bed height positioning including positioning very close to the floor. A typical low bed design further provides one or more support arm mechanisms pivotably attached onto the bed frame which extend near the head or foot of the bed. The support arms help to provide the aforesaid desirable low bed features and may contain rollers, but not castors, which bear upon the plane of the floor near the head or foot of the bed. Said support arms are typically controlled by one or more mechanical or hydraulic linear actuators which cause said support arms to pivot around each bed frame attachment point. Unfortunately, prior art low bed designs require the support arms to be positioned at a specific angle relative to the bed before the bed may be rolled on the floor. That is, typically the prior art bed must be in a fully lowered position before it engages castors mounted on the bed frame and thereby may be rolled on the floor plane.

The present art overcomes the aforesaid limitations of the prior art by utilizing a unique castor base arrangement which allows the user to adjust the height or angle of the bed to any desired level and further roll or move the bed on the two dimensional plane represented by the plane of the floor upon which the bed stands. The present art bed further allows a person to lock the bed and prevent movement in the two-dimensional floor plane at any user desired height or angle.

Prior art beds also require an initial actuator force for raising or lowering the bed which is substantially greater than that of the present art. This occurs due to a mechanical disadvantage presented to the actuators when a low bed is in a nearly or fully lowered position. The present art bed provides an actuator assist spring mechanism which presents an initial force to the bed support arms when the bed is nearly or fully lowered. This initial force helps to overcome the mechanical disadvantage presented to the actuators and thereby reduces the force output required from the actuators.

Accordingly, it is an object of the present invention to provide a low bed that is movable in any direction on the plane of the floor while positioned at a user desired height and/or angle;

Another object of the present invention is to provide a low bed which is stable and position lockable while providing the aforementioned features;

A further object of the present invention is to provide a low bed which utilizes castors instead of rollers while providing the aforementioned features;

A still further object of the present invention is to provide a low bed incorporating one or more actuator assist spring mechanisms which reduce the forces required by the actuators used to raise or lower the bed.

SUMMARY OF THE INVENTION

To accomplish the foregoing and other objects of this invention there is provided a height and angle adjustable bed having a rolling base. The apparatus represents an improvement in conventional low bed designs by allowing movement in any direction on the floor plane while the bed is positioned at a user desired height or angle. It also provides an actuator assist spring mechanism which reduces the linear actuator force necessary to raise the bed. In a preferred embodiment the apparatus comprises a bed frame having one or more pivotably attached support arms, one or more castor bases attached to said support arms opposite said bed frame attachment, one or more linear actuators attached between the bed frame and said support arms, and an actuator assist spring mechanism which reduces the linear actuator force necessary for lifting.

The difficulty in providing a two dimensional floor plane bed movement while also maintaining bed stability at a user desired height/angle position is best exemplified by referring to the operation of a typical offset castor wheel. The center mounting axis of a castor wheel as typically used on an office chair is offset from its mounting stud in order to ensure proper tracking when the chair is pushed. That is, if the center axis is not offset, the castor will not have the necessary moment arm of force around its mounting stud axis in order to ensure positioning and tracking of the castor in the direction of applied force. For proper operation, the castor mounting stud must maintain a nearly perpendicular relationship with the floor plane in order to operate properly and avoid premature failure. If a conventional castor is mounted directly onto the end of a low bed support arm, when the arm is moved about its bed frame support axis, the castor stud will not maintain a position which is perpendicular with the floor plane. This non-perpendicular positioning will cause the castor to jam and prohibit the castor from tracking and functioning as expected.

The present art overcomes the aforesaid prior art limitations by placing a pivoting castor base on a base shaft which is mounted onto or between the bed support arms opposite the pivotal attachment points. Each castor base comprises a castor frame with three or more castors which are offset from the axis of the rotating member. That is the three or more castors mounted onto the castor base form a polygonal castor plane, such as a triangle, square, rectangle, etc. which maintains a parallel relationship with the floor plane when in use. A preferred embodiment utilizes four castors in a substantially rectangular configuration with two locking castors.

In a preferred embodiment, the aforesaid base shaft comprises one or more shafts mounted onto a base tube supported by the support arms. The castor base mounted on said shafts is capable of pivoting in the same plane as the pivoting movement of the bed support arms. The offset castors mounted onto the castor base ensures a stable and firm wheeled base for the bed support arms while also allowing the wheeled base to pivot near the end of the bed support arms. Thus, as the bed support arms are lowered or raised, the wheeled base maintains the necessary perpendicular relationship between each castor mounting stud and the floor plane. Since the base has pivoting castors, the bed end having the aforesaid base is able to move easily in any direction on the two dimensional plane of the floor. That is, each castor pivots on its castor mounting stud in order to follow and track in the direction of applied force.

In a preferred embodiment, one or more of the castors contain a castor locking brake which is capable of locking the castor both rotationally and linearly. When locked, the castors prohibit movement of the bed on the floor plane. Nevertheless, when the preferred embodiment includes support arm wheels on the support arms not having the castor base, the bed may be raised or lowered while the castor base is locked. That is, in a preferred embodiment, the support arms near the foot of the bed contain the aforesaid castor base and the support arms near the head of the bed contain support arm wheels.

Another unique feature of the present invention is an actuator assist spring mechanism. As aforesaid, conventional low bed designs typically provide one or more bed support arms pivotably attached to the bed frame. Typically each bed support arm is forceably pivoted on its attachment point axis by a linear mechanical or hydraulic actuator. The linear actuator is typically positioned between a central portion of the support arms and the bed frame near the head or foot portions. As the bed is lowered, the linear actuator pivotably approaches an angle which is nearly parallel with the support arms. This means that only a small portion of the linear actuator force is perpendicular to the plane of the support arms which require rotational movement. That is the perpendicular force is represented by the equation:

$$F_p=F_l\sin\Theta$$

where $F_p$ is the force perpendicular to the plane of the actuated support arms, $F_l$, is the linear actuator force, and $\Theta$ is the angle between the plane formed by the support arms and the linear actuator. Thus, when the support arms and the linear actuator approach a parallel configuration, $\Theta$ becomes smaller and approaches zero. This means that a much smaller portion of the linear actuator force $F_l$, is available to pivot the support arms on their axis. At a lowered position, the linear force needed to raise the support arms can be many times the bed supporting weight thereby necessitating use of a high force actuator.

The present art overcomes the aforementioned high force actuator requirement by incorporating one or more actuator assist spring mechanisms between the bed frame and each support arm. Each assist spring compresses upon bed lowering, thus providing a portion of the lifting force necessary when the bed is raised. The added assist allows the present art low bed to utilize a smaller force linear actuator than would be necessary without the assist spring. In a preferred embodiment, each support arm has an assist arm attached to the support arm near the pivot point with the bed frame. The assist arm acts as the compressing arm for the assist spring mechanism.

The aforementioned frame, support arms, castor base, and associated components may be manufactured from a variety of materials which provide the structural strength necessary. These include but are not limited to materials such as iron, steel, aluminum, titanium, and magnesium along with alloys of such, and plastics, composites, and various woods. The castor and support arm wheels are typically a hard or soft molded plastic or rubber material.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
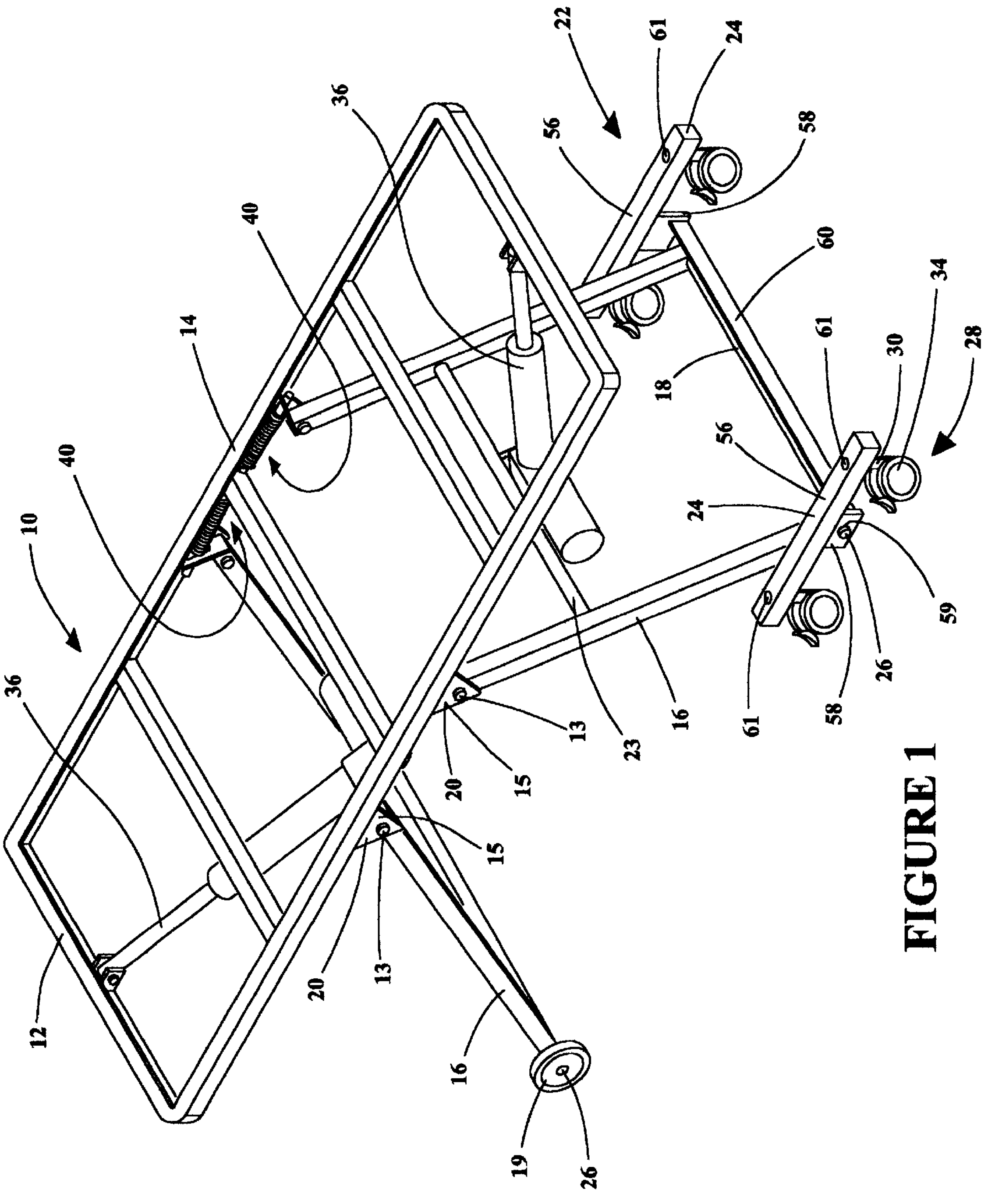
FIG. 1 is a perspective view of the height and angle adjustable bed in an elevated position.
Figure 2:
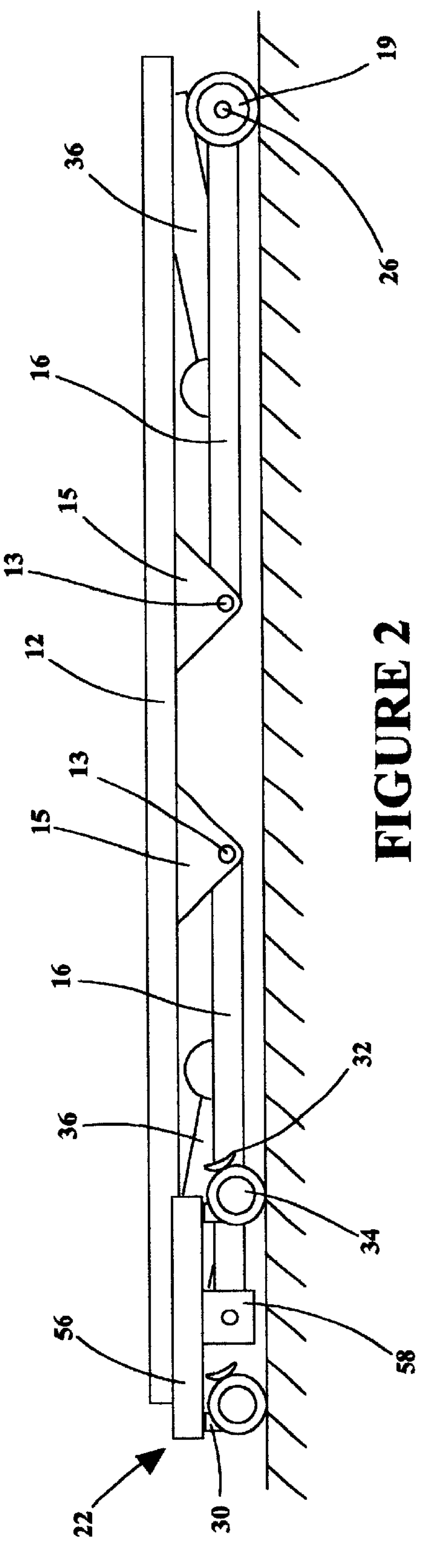
FIG. 2 is a side plan view of the height and angle adjustable bed in a lowered position.
Figure 3:
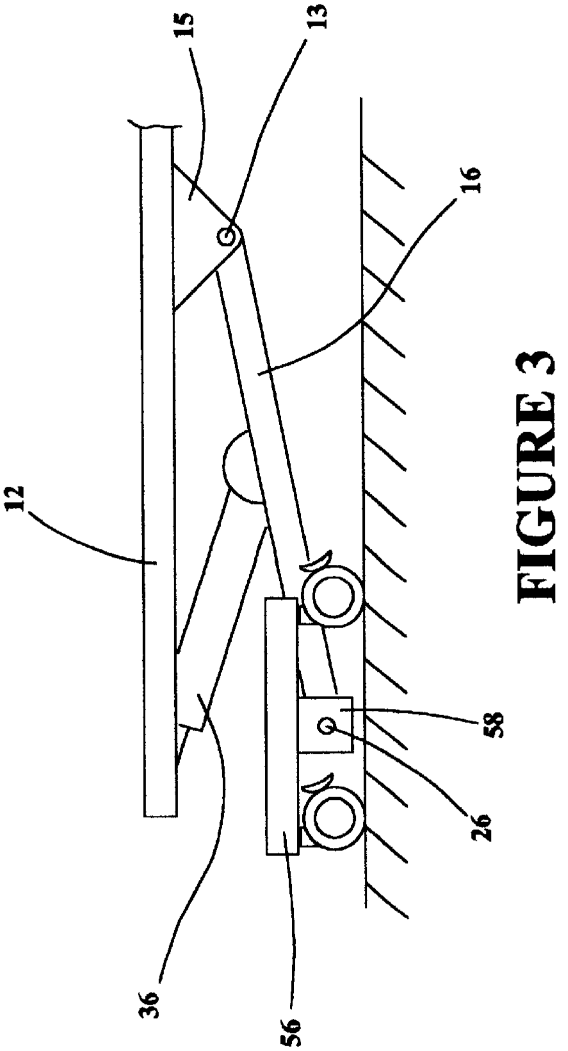
FIG. 3 is a right side sectional plan view of an end of the height and angle adjustable bed having a castor base in a nearly lowered position.
Figure 4:
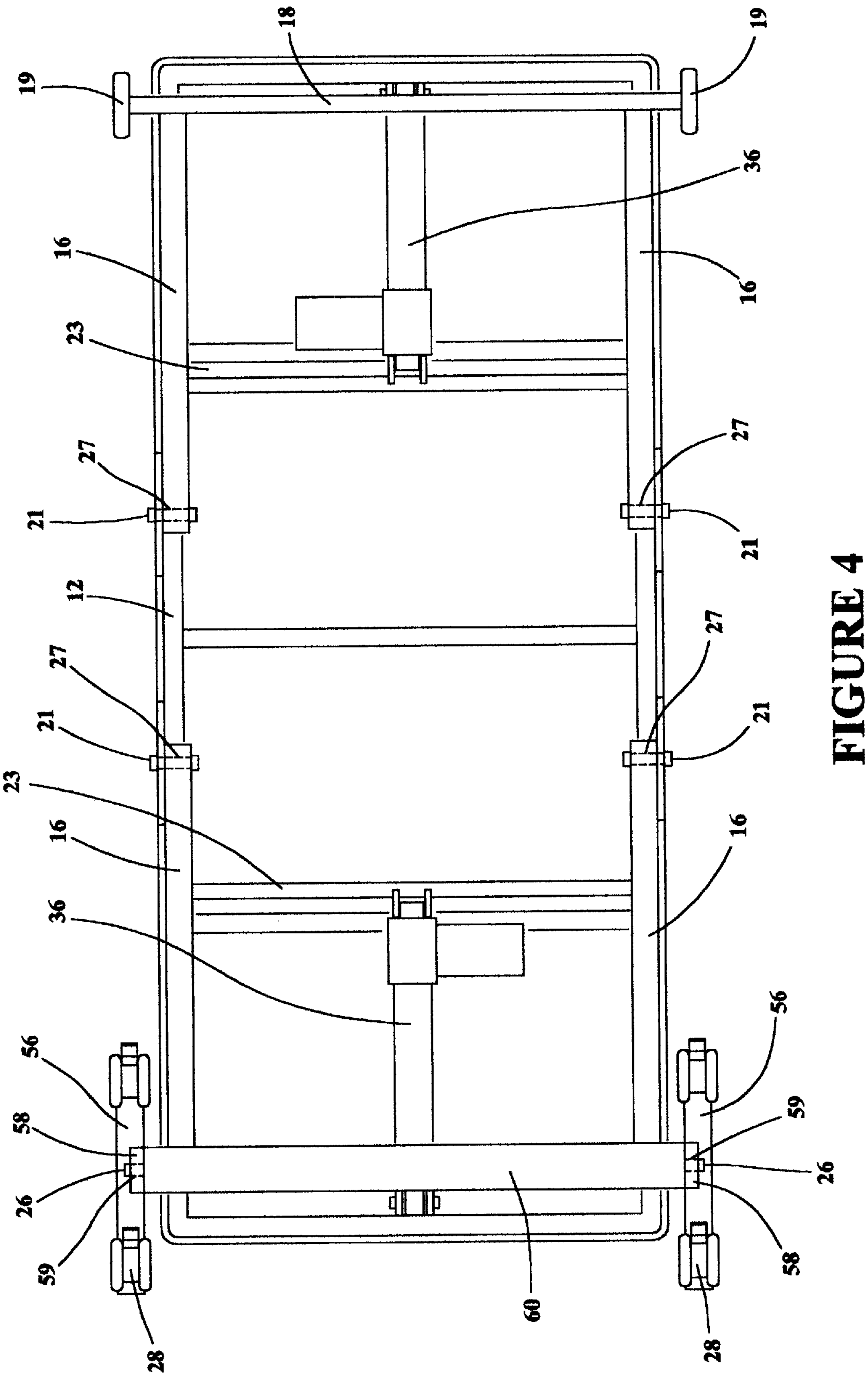
FIG. 4 is a bottom side plan view of the height and angle adjustable bed in a lowered position.
Figure 5:
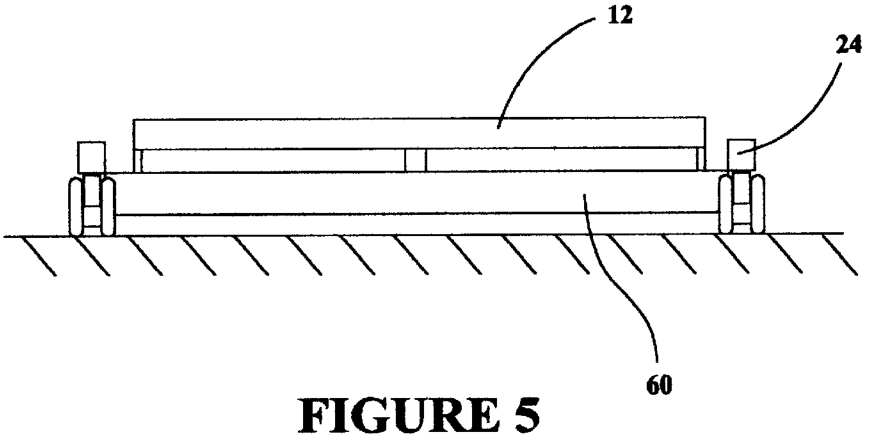
FIG. 5 is a front side plan view of the height and angle adjustable bed in a lowered position showing a castor base.
Figure 6:
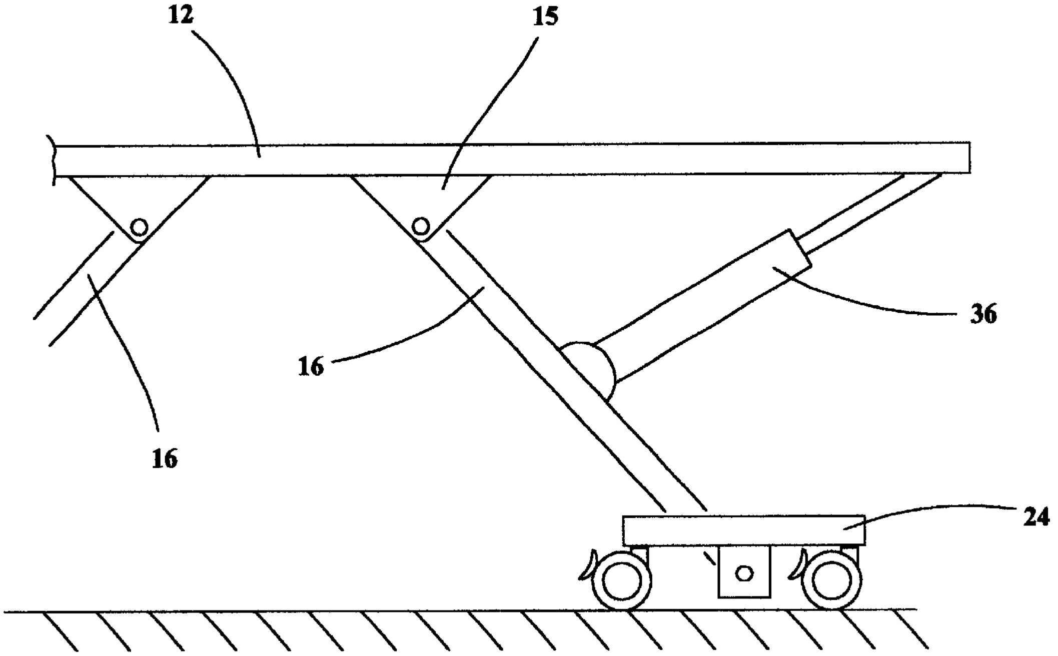
FIG. 6 is a left side sectional plan view of an end of the height and angle adjustable bed in an elevated position showing a castor base.
Figure 7:
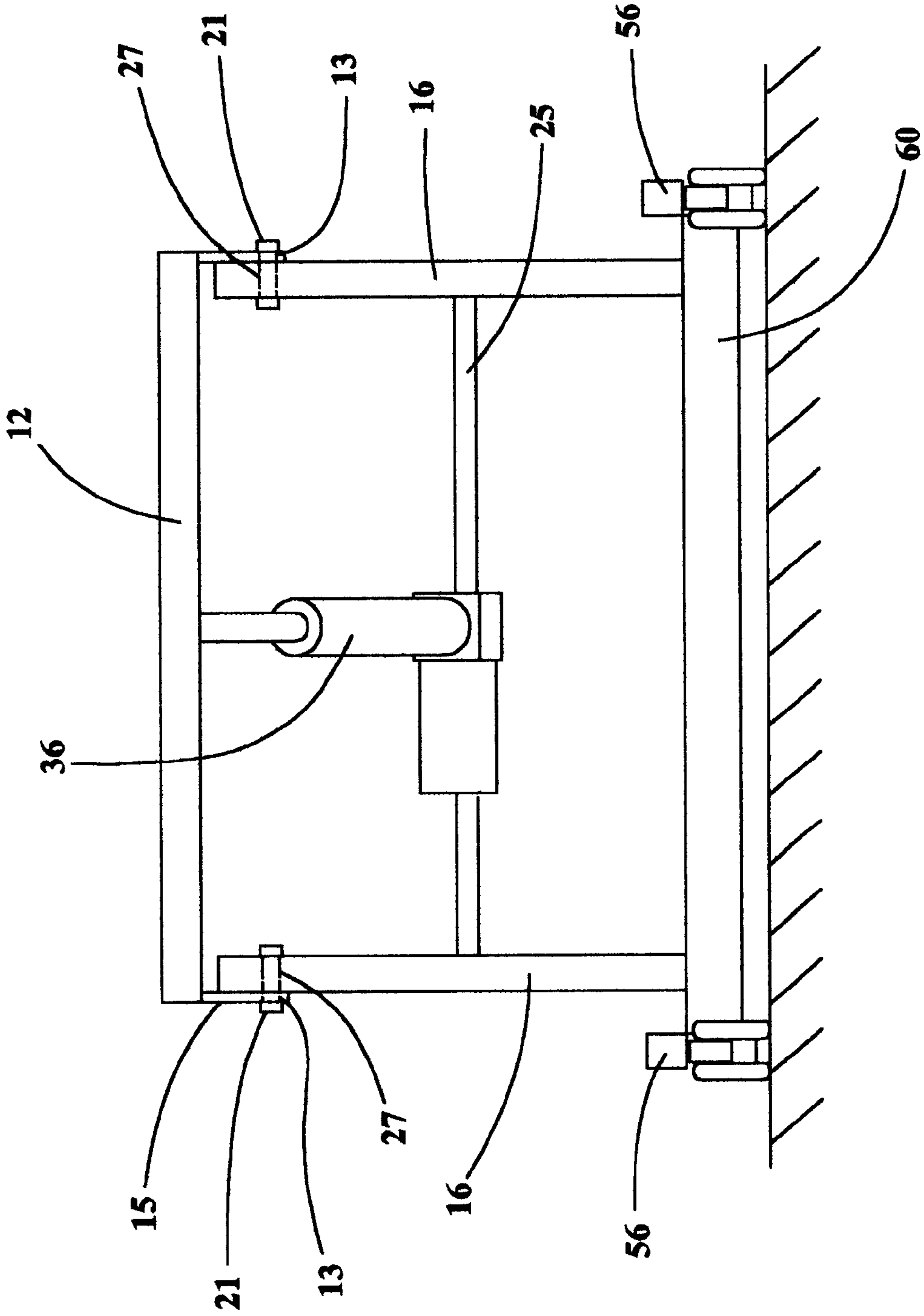
FIG. 7 is a sectional elevation view from beneath the height and angle adjustable bed in an elevated position looking toward an end portion of the bed showing a castor base and support arms.
Figure 8:
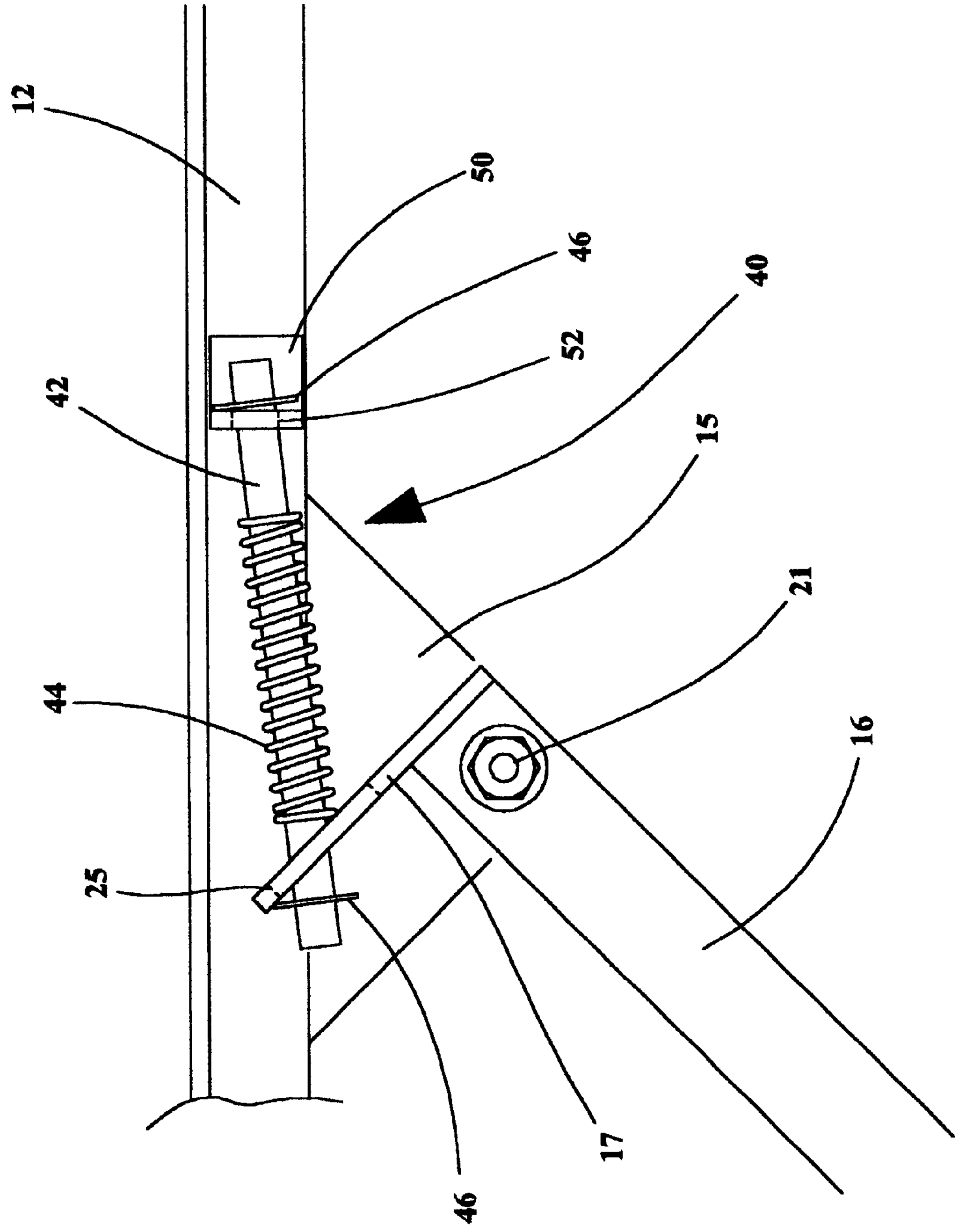
FIG. 8 is a sectional elevation view of the actuator assist spring mechanism and support arm viewed from beneath the height and angle adjustable bed in an elevated position.
Figure 9:
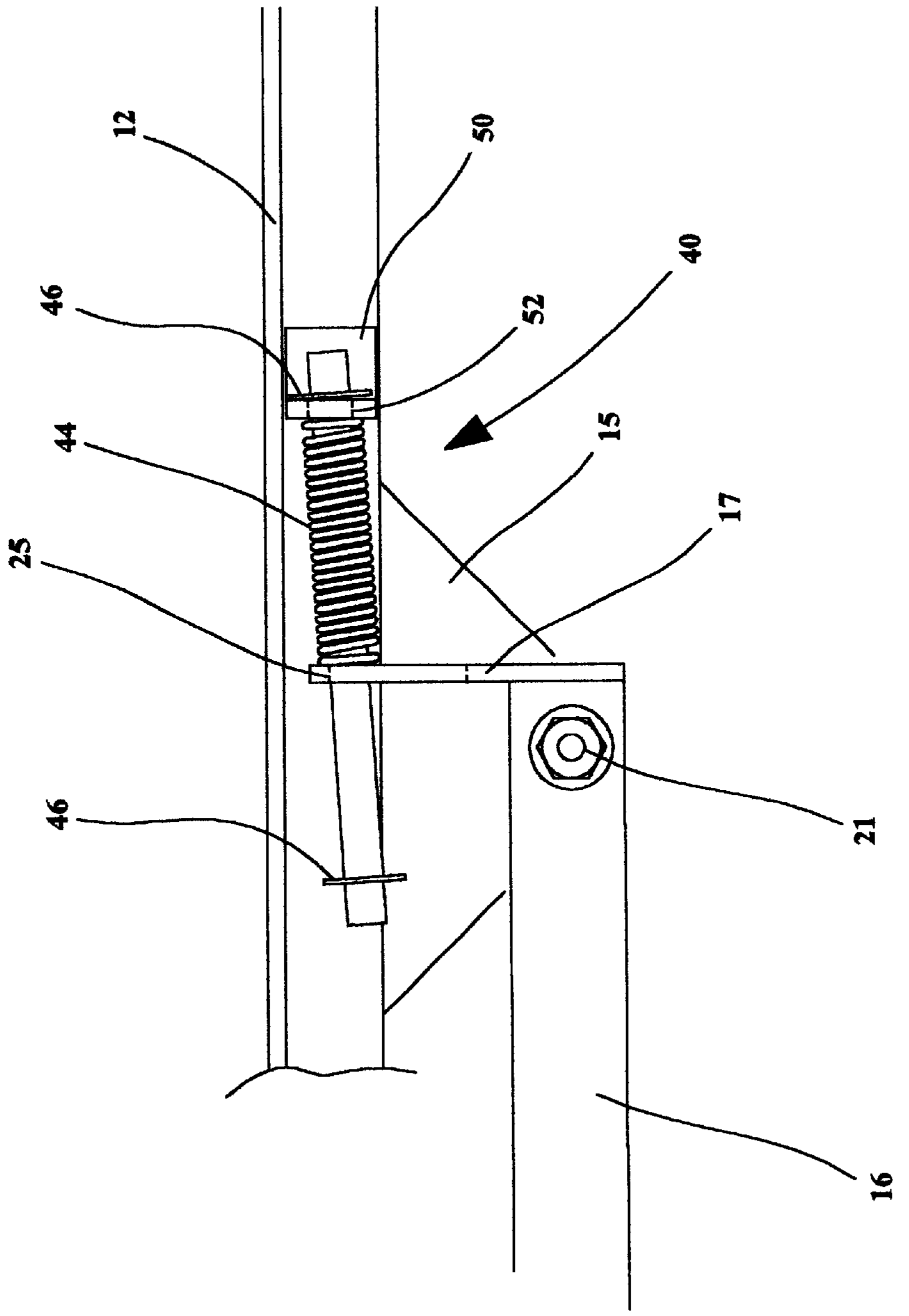
FIG. 9 is a sectional elevation view of the actuator assist spring mechanism and support arm viewed from beneath the height and angle adjustable bed in a lowered position.

Referring now to the drawings, there is shown in FIGS. 1–9 a height and angle adjustable bed having a rolling base 10. The height and angle adjustable bed having a rolling base 10 is uniquely capable of providing movement in any direction on the floor plane while positioned at any user desired height or angle. The bed 10 further provides a unique actuator assist spring mechanism 40 which minimizes the linear actuator 36 force necessary for height and angle adjustment.

The drawings show the apparatus comprising a bed frame 12 having a head, foot, top, bottom, right, left, and central portion, one or more bed support arms 16, one or more castor bases 22, one or more linear actuators 36, and one or more actuator assist spring mechanisms 40. Each support arm 16 is pivotably attached 20 near a central portion 14 of the bed frame 12 and extends outward toward the head or foot of the bed 10. In a preferred embodiment, a support flange 15 is attached to the bottom of said bed frame 12 and said support arm 16 is pivotably held by said flange 15 with a support shaft 21. The support shaft 21 is typically a bolt placed through a flange hole 13 and an arm hole 27. In alternative embodiments, the support shaft 12 may be any other shaft form which allows pivoting of the support arm 16. Alternative embodiments may forego use of said flange 15 and pivotably mount said support arm 16 directly onto the bed frame 12.

In a preferred embodiment, a pair of bed support arms 16 are used near each end of the bed 10 for a total of four. That is, a support arm 16 is placed on each side of the bed 10 and directed toward each end for optimum bed 10 stability. The preferred embodiment ties each pair of support arms 16 together with a crossarm 23 and a base tube 18. Each crossarm 23 and base tube 18 are attached between the pair of support arms 16 by welding each in place. The crossarm 23 and base tube 18 may also be attached by any other attachment means such as bolts, rivets, or adhesives. Alternative embodiments may use a single bed support arm 16 on one or both ends which is centrally and pivotably mounted and also of sufficient structural strength to support the bed 10.

The pivoting of each support arm 16 pair on the support shafts 21 allows the bed 10 to be raised or tilted as desired. In a preferred embodiment, a linear actuator 36 forceably pivots each pair of support arms 16. The linear actuator 36 is typically a hydraulic cylinder or motorized mechanical linear force actuator. In a preferred embodiment, a first end of the linear actuator 36 is pivotably attached onto the crossarm 23 and a second end of the linear actuator 36 is pivotably attached onto the bed frame 12 near an end of the bed 10. That is, near the head or foot of the bed 10 which lies above the pivoting support arms 16.

In a preferred embodiment, each support arm 16, has an assist arm 17 integrally attached near the pivotable attachment point 20 near the central portion 14 of the bed frame 12. The assist arm 17 is an extension of the support arm 16 and positioned at a generally perpendicular angle relative to the support arm 16 in a preferred embodiment. Alternative embodiments may incorporate the assist arm 17 parallel with and as an integral part of the support arm 16. The assist arm 17 serves as a compressor for the actuator assist spring mechanism 40 when the bed 10 is nearly or fully lowered. As aforesaid, the actuator assist spring mechanism 40 serves to provide an initial pivoting force on the support arms 16 when the bed 10 is near or at a fully lowered position. In the preferred embodiment, the actuator assist spring mechanism 40 is mounted between the assist arm 17 and an assist guide 50 mounted onto the bed frame 12. Alternative embodiments may forego use of the assist guide 50 by incorporating its function within the bed frame 12. This unique feature minimizes the initial force required by the linear actuator 36 to raise the bed 10. That is, due to the aforesaid mechanical disadvantage which each linear actuator 36 has as it becomes more closely parallel and aligned with the support arms 16, the force required by each linear actuator 36 to raise the bed 10 increases toward infinity. Thus, the actuator assist spring mechanism 40 provides enough force onto the assist arm 17 in order to assist pivoting of the support arms 16 into an angle relative to the linear actuator 36 which substantially reduces the mechanical disadvantage of the linear actuator 36. This unique feature substantially reduces the size, weight, and output force requirement of the linear actuator 36.

The actuator assist spring mechanism 40 comprises a spring shaft 42, an assist spring 44 and one or more shaft keepers 46. The spring shaft 42 mounts through an arm slot 25 in the assist arm 17 and a guide hole 52 in the assist guide 50. In a preferred embodiment, onto the ends of each spring shaft 42 is placed a shaft keeper 46, such as an enlarged end, a nut and washer, C-clip, etc. to ensure that the spring shaft 42 does not withdraw from the arm slot 25 or the guide hole 52. Alternative embodiments may place the shaft keeper(s) 46 at only one end or forego use of the shaft keeper(s) 46 completely and hold the spring shaft 42 by other means such as pins, mating grooves, or a frictional fit without departing from the scope of the present art. The assist spring 44 is typically a coil spring which is placed onto said spring shaft 42 between said arm slot 25 and guide hole 52 and is larger in diameter than the width of said slot 25 or the diameter of said hole 52. Thus when the bed 10 is lowered, the assist arm 17 compresses the assist spring 44 against the assist guide 50, thereby providing an initial force on each support arm 16 during bed raising.

Alternative embodiments may place the assist arm 17 at other angles relative to the support arms 16 or incorporate the assist arm 17 together with the support arm 16. The aforesaid Alternative embodiments will not depart from the scope and spirit of the present invention provided that the actuator assist spring 44 is compressed and allowed to assist raising movement of the support arms 16 when the bed 10 is in a nearly fully lowered position. Further alternative embodiments may incorporate other types of assist springs such as leaf springs or torsion bars without departing from the spirit of the present invention.

As aforesaid, onto the support arms 16 opposite said pivotal attachment 20 is mounted a base tube 18 onto which is pivotably mounted a castor base 22 or one or more support arm wheels 19. The base tube 18 is of generally tubular form and rigidly attached between said support arms 16. The castor base 22 comprises a castor frame 24 pivotably mounted and attached onto the base tube 18 with a base shaft 26. The base shaft 26 typically comprises a bolt placed through a frame ear 58 on said castor base 22 and mated with a threaded insert mounted into the base tube 18. In a preferred embodiment, the aforementioned form of base shaft 26 is used on each support arm 16. Each support arm wheel 19 is also held with a base shaft 26 when used. Alternative embodiments may forego use of the base tube 18 and mount said base shafts 26 directly onto one or more support arms 16.

The castor frame 24 may form any planar polygonal form but defines a substantially rectangular "H" form in the preferred embodiment. In the preferred embodiment, the castor frame 24 comprises a substantially "H" shaped member having two frame arms 56 rigidly connected in perpendicular relation via a frame support angle 60. Each frame arm 56 also has a frame ear 58 rigidly connected and extending downward from near the midpoint of each frame arm 56. As aforesaid, each frame ear 58 is pivotably held onto said base tube 18 with a base shaft 26, typically a bolt, through an ear hole 59 in each frame ear 58. The aforementioned shaft 26 and ear 58 combination thereby pivotably holds the entire castor base 22. Alternative embodiments may pivotably hold the castor frame 24 onto each support arm 16 with a variety of methods including but not limited to shaft and bearing assemblies, ball joint arrangements, flexible couplings, or torsion bars, provided each is capable of supporting the working load of the bed 10. Alternative embodiments may also forego utilization of the frame support angle 60 without departing from the spirit of the present art. That is, each frame arm 56 may be allowed to pivot independently upon its own base shaft 26.

Onto the castor frame 24 is mounted at least three castors 28 with the preferred embodiment having four castors 28, one mounted at each end of the frame arms 56, that is, at the edges of the "H" form. In a preferred embodiment, the castor mounting stud 30 is rigidly held in an arm hole 61 within each frame arm 56. Alternative embodiments may weld or rigidly affix the castor mounting stud 30 to the frame arm 56 without departing from the spirit of the present invention. Further alternative embodiments may allow the castor mounting stud 30 to rotate within the arm hole, provided the user does not require rotational locking of the castor mounting stud 30. In a preferred embodiment, two of the aforesaid castors 28 have an integral castor locking brake 32 which at the user's option may lock the castor 28 to prevent castor wheel 34 movement and also prevent rotational movement on the castor mounting stud 30. Alternative embodiments may provide one or more integral castor locking brakes 32 without departing from the spirit of the present invention.

A unique feature of the present invention in all of its embodiments is the ability of the castor base 22 to provide a pivoting but structurally stable planar polygonal base which includes integrally mounted castors 28. The pivoting feature relative to the support arms 16 ensures a substantially perpendicular relation between the castor mounting stud 30 and the plane of the floor, thereby further ensuring optimum castor operation. Attachment of the mounting stud 30 near or onto the ends of the frame arms 56 provides maximum separation between the castors 28, thereby providing the most stable castor base.

As aforesaid, a castor 28 will not function properly if its mounting stud 30 deviates appreciably from a perpendicular relationship with the plane of the floor onto which it rolls. In light of the aforementioned requirement for proper operation, the castor base 22 with its attached castors 28 may be pivotably attached to the support arm 16 ends with any method or apparatus that allows the rigid base 22 to pivot. Again, this includes but is not limited to shaft and bearing assemblies, ball joint arrangements, flexible couplings, or torsion bars, provided each is capable of supporting the working load of the bed 10.

The preferred embodiment places a castor base 22 on a pair end of support arms 16 and a pair of support arm wheels 19 on the opposite pair end of support arms 16. This preferred embodiment allows the user to move the bed 10 end, generally the foot, having the castor base in any direction on the floor plane. The support arm 16 ends having support arm wheels 19 thereafter follow the directional movement of the castor base 22 in an arcing or linear motion on the floor plane.

Alternative embodiments may utilize a castor base 22 at the ends of each support arm 16 pair. This alternative provides further freedom of movement on the floor plane by allowing both the head and foot of the bed 10 to be moved in any direction on the floor plane. Nevertheless, the aforesaid alternative embodiment presents further complexities related to castor 28 locking and braking. That is, with the preferred embodiment, locking of one castor 28 on the castor base 22 fixes the bed 10 into position on the floor plane. By design, the support arm wheels 19 cannot move laterally relative to the head-foot bed 10 axis, i.e. left to right, and a locked castor 28 prohibits any floor plane movement of the castor base 22, including linear movement in the head-foot bed 10 axis. If a castor base 22 is substituted for the support arm wheels 19, complete bed 10 position locking requires that at lease one castor locking brake 32 on each castor base 22 be activated. Furthermore, this alternative embodiment prohibits bed 10 height adjustment when both castor bases 22 are locked.

In operation, the user causes the linear actuator to raise or lower the support arm 16 at each end for the desired bed 10 height and angle. When the bed 10 requires movement, force is applied in the desired movement direction on the castor base 22 end of the bed 12. Each castor 28 then rotates upon its mounting stud 30 in order to align each castor wheel 34 with the direction of desired travel and the castor wheel 34 begins to rotate. If equipped with a pair of support arm wheels 19, said wheels follow and track the castor base 22 movement. When placed at a desired location, the castors 28 may be locked in all axis via the action of the integral castor locking brake 32. This prevents the castor base 22 from moving in any direction and thereby secures the bed 10 in a fixed location. Moreover, since the support arm wheels 19 may rotate when the castor base 22 is locked, the bed 10 may be raised or lowered when in a castor 28 is in a locked position.

From the foregoing description, those skilled in the art will appreciate that all objects of the present invention are realized. A height and angle adjustable bed having a rolling base is shown and described. The apparatus allows bed movement on the plane of the floor when adjusted to any desired height. In a preferred embodiment, the apparatus also allows bed height and angle adjustment when locked into position. Further innovative concept is provided by utilization of an actuator assist spring mechanism in conjunction with the bed support arms. The actuator assist spring mechanism reduces the required linear actuator force output.

In view of the above, it will be seen that the objects and features of this invention are achieved and other advantageous results attained. Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. A low height and angle adjustable bed having a rolling base which is capable of rolling upon a floor plane comprising:

a bed frame having a head, foot, right, left, and central portion; and two or more bed support arms pivotably attached to said bed frame in a non-translatory manner; and at least one mechanical linear force actuator pivotably attached to at least one of said support arms and said bed frame; and at least one castor base pivotably attached to at least one of said support arms near the floor plane and capable of pivoting independent of movement of said bed support arms; and said castor base comprising a castor frame having three or more castors mounted thereon in a substantially polygonal form, whereby said castors of said polygonal form rest upon the floor plane and maintain said castor base stable yet moveable in the floor plane.

2. The height and angle adjustable bed having a rolling base as set forth in claim 1 further comprising:

an assist arm mounted onto at least one of said bed support arms near said pivotal attachment with said bed frame; and an actuator assist spring mechanism located between said assist arm and said bed frame, whereby said actuator assist spring mechanism provides an assist force onto said support arm when said bed frame is placed in a nearly or fully lowered position.

3. The height and angle adjustable bed having a rolling base as set forth in claim 1 further comprising:

two or more support arm wheels each rotatably mounted onto a base shaft; and said base shafts mounted onto at least one of said support arms near the floor plane and also opposite said castor base.

4. The height and angle adjustable bed having a rolling base as set forth in claim 1, said castor frame further comprising:

two or more frame arms each having two ends; and each of said frame arms having an arm hole near each of said ends, whereby a castor mounting stud may mount within; and two or more frame ears, each frame ear mounted onto a frame arm; and each of said frame ears having an ear hole; whereby a base shaft integrally mounted with each of said bed support arms may pivotably attach said castor base through said ear holes.

5. The height and angle adjustable bed having a rolling base as set forth in claim 4, said castor frame further comprising:

said frame arms rigidly connected together with a frame support angle to form a substantially "H" shaped member.

6. The height and angle adjustable bed having a rolling base as set forth in claim 1, said one or more of said castors further comprising:

a castor locking brake capable of pivotably locking said castor on a castor mounting stud and rotationally locking a castor wheel.

7. The height and angle adjustable bed having a rolling base as set forth in claim 4, said one or more of said castors further comprising:

a castor locking brake capable of pivotably locking said castor on said castor mounting stud and rotationally locking a castor wheel.

8. A low height and angle adjustable bed having a rolling base which is capable of rolling upon a floor plane comprising:

a bed frame having a head, foot, right, left, and central portion; and one or more bed support arms pivotably attached to said bed frame; and at least one linear actuator pivotably attached to at least one of said support arms and said bed frame; and at least one castor base pivotably attached to at least one of said support arms near the floor plane; and said castor base comprising a castor frame having three or more castors mounted thereon in a substantially polygonal form, whereby said castors of said polygonal form rest upon the floor plane and maintain said castor base stable yet moveable in the floor plane; and an assist arm mounted onto at least one of said bed support arms near said pivotal attachment with said bed frame; and an actuator assist spring mechanism located between said assist arm and said bed frame, whereby said actuator assist spring mechanism provides an assist force onto said support arm when said bed frame is placed in a nearly or fully lowered position; and a spring shaft having two ends and placed through an assist spring; and an assist guide integrally mounted onto said bed frame, said assist guide having a guide hole therein of smaller diameter than an outside diameter of said assist spring and through which one of said ends of said spring shaft is placed; and an arm slot in said assist arm, said arm slot having a width less than said outside diameter of said assist spring and through which another of said ends of said spring shaft is placed; and at least one shaft keeper near at least one of said spring shaft ends, whereby said shaft keeper holds said spring shaft in place within said guide hole and said arm slot and further allows compression of said assist spring between said assist arm and said assist guide to create said assist force onto said support arm when said bed frame is placed in a nearly or fully lowered position.

9. A height and angle adjustable bed having a rolling base comprising:

a bed frame having a head, foot, right, left, top, bottom and central portion; and four support flanges mounted on said bottom portion of said bed frame near said central portion whereby two support flanges are mounted near the left portion and two support flanges are mounted near the right portion, each of said support flanges having a flange hole; and four bed support arms each having two ends and an arm hole near one of said ends, each of said bed support arms pivotably attached to one each of said support flanges with a support shaft placed through each of said arm holes and said flange holes; and a first crossarm rigidly mounted between two support arms nearest the foot portion of the bed; and a second crossarm rigidly mounted between two support arms nearest the head portion of the bed; and a first base tube having two ends and rigidly mounted between two support arms nearest the foot portion of the bed and opposite said support flanges; and a second base tube having two ends and rigidly mounted between two support arms nearest the head portion of the bed and opposite said support flanges; and a first linear actuator pivotably attached between said first crossarm and said bed frame near said foot portion; and a second linear actuator pivotably attached between said second crossarm and said bed frame near said head portion; and four base shafts each mounted within and extending from one each of said ends of each of said first and second base tubes; and a castor base pivotably attached to said base shafts extending from said first base tube; and said castor base comprising a castor frame having four castors mounted thereon in a substantially polygonal form, whereby said castors of said polygonal form rest upon a plane of a floor and maintain said castor base stable yet moveable in the plane of said floor; and two support arm wheels each rotatably mounted onto one each of said base shafts extending from said second base tube.

10. The height and angle adjustable bed having a rolling base as set forth in claim 9 further comprising:

four assist arms each rigidly mounted onto one each of said bed support arms near said pivotal attachment with said bed frame, each of said assist arms having an arm slot having a width; and four assist guides each rigidly mounted onto said bed frame near one each of said assist arms, each of said assist guides having a guide hole having a diameter; and four actuator assist spring mechanisms each located between and through one each of said assist arms and one each of said assist guides;

each of said actuator assist spring mechanisms comprising a spring shaft having a first and a second end, said first end placed through said arm slot and said second end placed through said guide hole, an assist spring of greater diameter than said width of said arm slot and said diameter of said guide hole moveably mounted onto said spring shaft between said assist guide and said assist arm, and at least one shaft keeper on at least one of said ends of said spring shaft, whereby said assist spring compresses when said bed frame is placed in a nearly or fully lowered position and thereby provides an assist force onto each of said support arms.

11. A low height and angle adjustable bed having a rolling base comprising:

a bed frame having a head, foot, right, left, and central portion; and two or more bed support arms pivotably attached to said bed frame; and at least one mechanical linear force actuator pivotably attached to at least one of said support arms and said bed frame; and an assist arm mounted onto at least one of said bed support arms near said pivotal attachment with said bed frame; and an actuator assist spring mechanism located between said assist arm and said bed frame, whereby said actuator assist spring mechanism provides an assist force onto said support arm when said bed frame is placed in a nearly or fully lowered position.

12. A method of allowing a low height and angle adjustable bed to move in any direction on a floor plane when positioned at any height or angle, the steps comprising:

forming a bed frame having a head, foot, right, left, and central portion; and pivotably attaching two or more bed support arms to said bed frame with two or more support shafts whereby said support shafts do not move translatory upon said bed frame; and mounting at least one mechanical linear force actuator between at least one of said support arms and said bed frame; and pivotably mounting at least one castor base to at least one of said support arms near the floor plane whereby said castor base pivots independent of movement of said bed support arms; and mounting three or more castors in a polygonal form onto said castor base, whereby said castors of said polygonal form rest upon the floor plane and maintain said castor base stable yet moveable in the floor plane independent of the height or angle of said bed frame.

13. The method of allowing a low height and angle adjustable bed to move in any direction on a floor plane when positioned at any height or angle as set forth in claim 12, the steps further comprising:

forming an assist arm onto at least one of said bed support arms near said support shaft; and placing an actuator assist spring mechanism between said assist arm and said bed frame; and compressing said assist spring mechanism by lowering said bed to a nearly fully lowered position and thereby placing a force between said assist arm and said bed frame; and decompressing said assist spring mechanism by utilizing the force of said assist spring mechanism between said assist arm and said bed frame and actuating said mechanical linear force actuator thereby raising said bed from said nearly fully lowered position.

14. A method of allowing a height and angle adjustable bed having a mechanical linear force actuator to raise, the steps comprising:

forming a bed frame having a head, foot, right, left, and central portion; and pivotably attaching two or more bed support arms to said bed frame with two or more support shafts; and mounting at least one mechanical linear force actuator between at least one of said support arms and said bed frame; and forming an assist arm onto at least one of said bed support arms near said support shaft; and placing an actuator assist spring mechanism between said assist arm and said bed frame; and compressing said assist spring mechanism by lowering said bed to a nearly fully lowered position and thereby placing a force between said assist arm and said bed frame; and decompressing said assist spring mechanism by utilizing the force of said assist spring mechanism between said assist arm and said bed frame and actuating said mechanical linear force actuator thereby raising said bed from said nearly fully lowered position.

* * * * *